Figure 4:
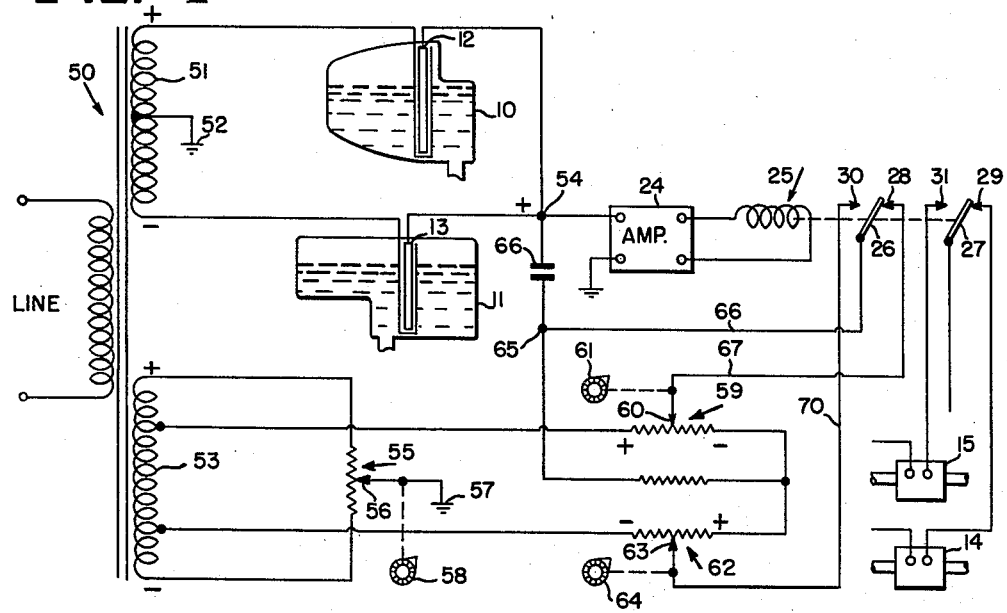

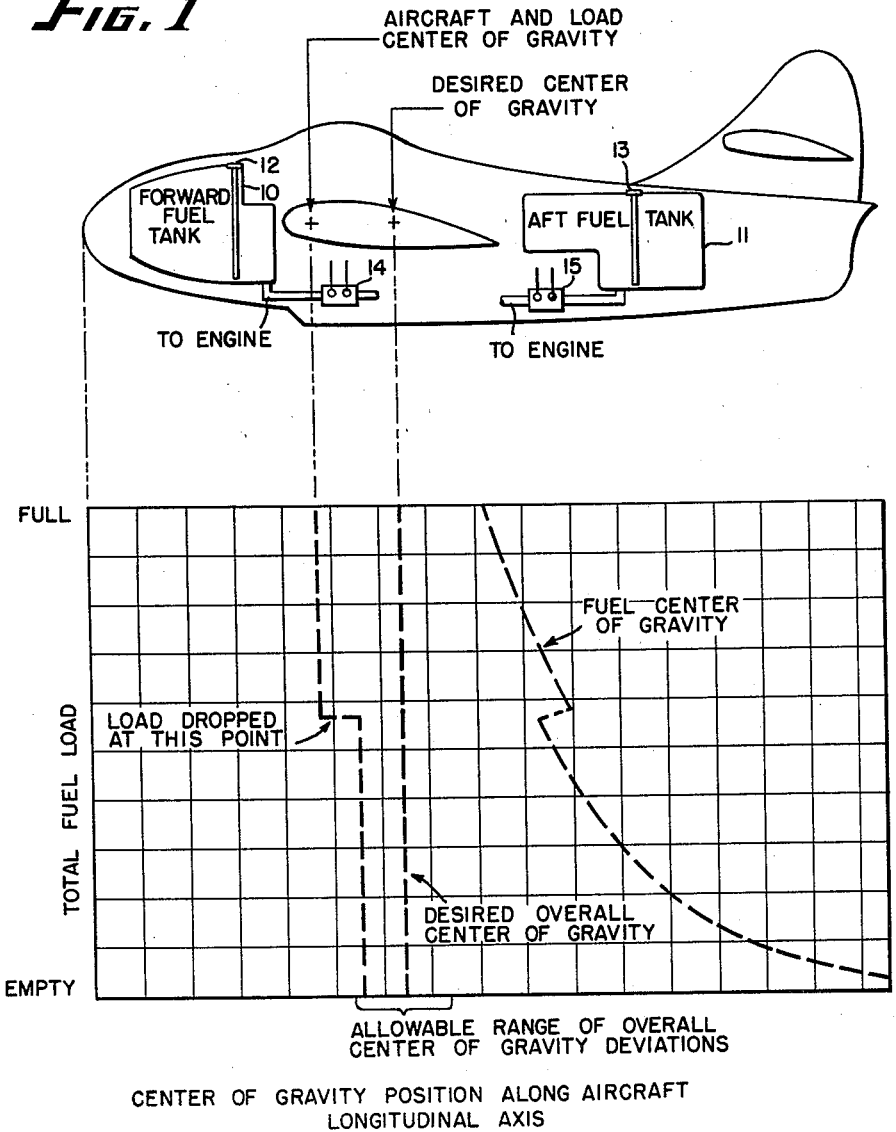

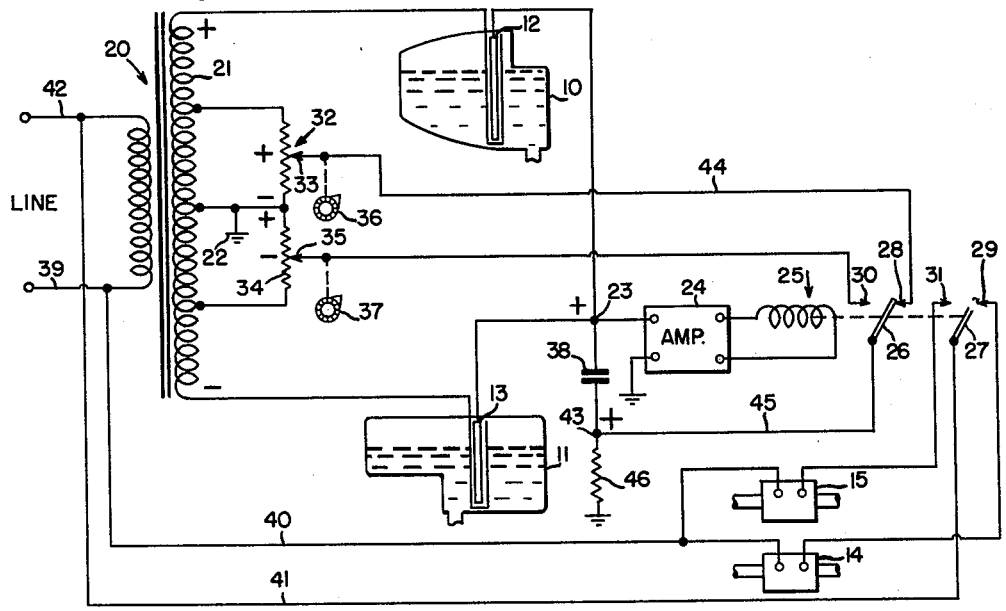
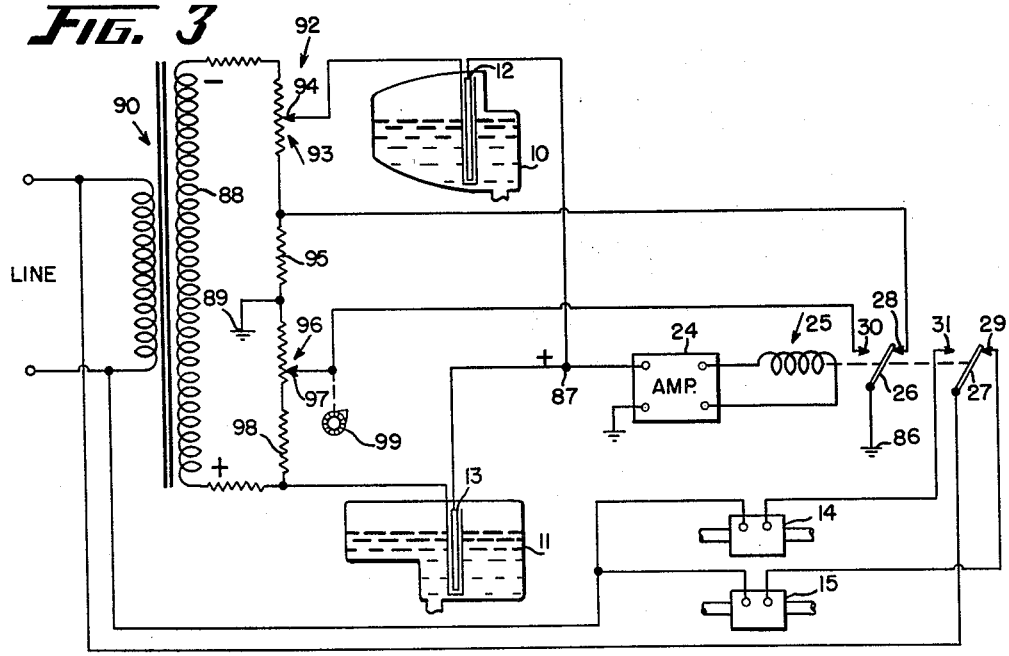

Nov. 15, 1960

D. C. JOHNSTON ET AL 2,960,294

CONTROL APPARATUS

Filed Dec. 1, 1954

4 Sheets-Sheet 3

INVENTORS
DONALD C. JOHNSTON
WILLIAM R. WILSON
BY *Frederick E. Lange*

ATTORNEY

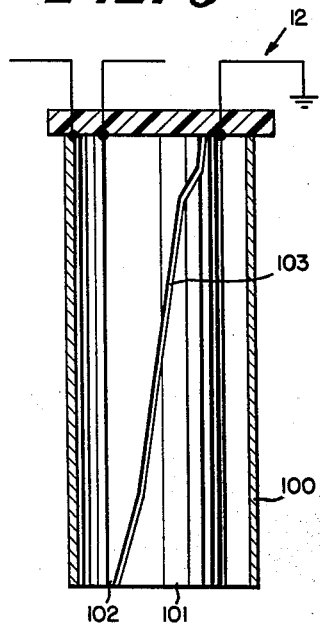
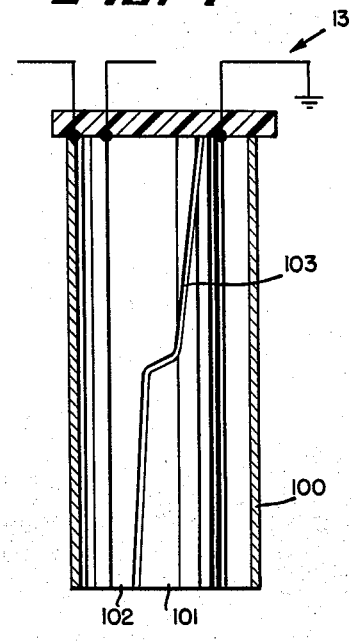

United States Patent Office 2,960,294
Patented Nov. 15, 1960

2,960,294

CONTROL APPARATUS

Donald C. Johnston, Richfield, and William R. Wilson, St. Louis Park, Minn., assignors to Minneapolis-Honeywell Regulator Company, Minneapolis, Minn., a corporation of Delaware Filed Dec. 1, 1954, Ser. No. 472,314

12 Claims. (Cl. 244—135)

The present invention is concerned with control apparatus and more particularly with center of gravity control apparatus for use with an aircraft having a plurality of fuel tanks.

In modern high speed long range aircraft, the design of the aircraft has resulted in the placing of fuel tanks in spaces which are often far from the desired center of gravity of the aircraft. The good part of the gross weight of the loaded aircraft consists of fuel and therefore the distribution of this fuel throughout the aircraft has a pronounced effect on the overall center of gravity of the craft. The basic design of the aircraft yields a Mean Aerodynamic Chord and in order for the aircraft to be flyable the center of gravity of the aircraft must lie in a definite portion of this Mean Aerodynamic Chord. Unless the overall center of gravity of the aircraft is held within these defined limits stable controlled flight is not possible.

Also, in modern aircraft there is an increasing demand on the attentive facilities of the pilot. Therefore there is a need for automatic and continuous means of center of gravity control of the aircraft, which means does not require the attention of the pilot.

It is also important to provide means for adjusting the differential of the system to provide for an acceptable compromise between the number of valve or pump operations per flight and the tolerable range of variations in the aircraft center of gravity. Such a differential adjustment should also provide positive or snap action, under conditions of shock, vibration, and fuel sloshing.

It is therefore an object of the present invention to provide an improved center of gravity control apparatus for use with an aircraft which is automatic and which causes the center of gravity of the aircraft to be maintained within predetermined limits.

It is a further object of the present invention to provide an improved center of gravity control apparatus wherein means are provided to adjust the range of variation of the center of gravity of the aircraft.

It is a further object of the present invention to provide an improved center of gravity control apparatus utilizing a capacity bridge yielding a signal indicative of the moment unbalance of fuel tanks located on opposite sides of an axis of the aircraft, and providing means to control the distribution of fuel in the tanks to control the center of gravity in a predetermined range, and means to control the differential of the bridge.

Figure 5:
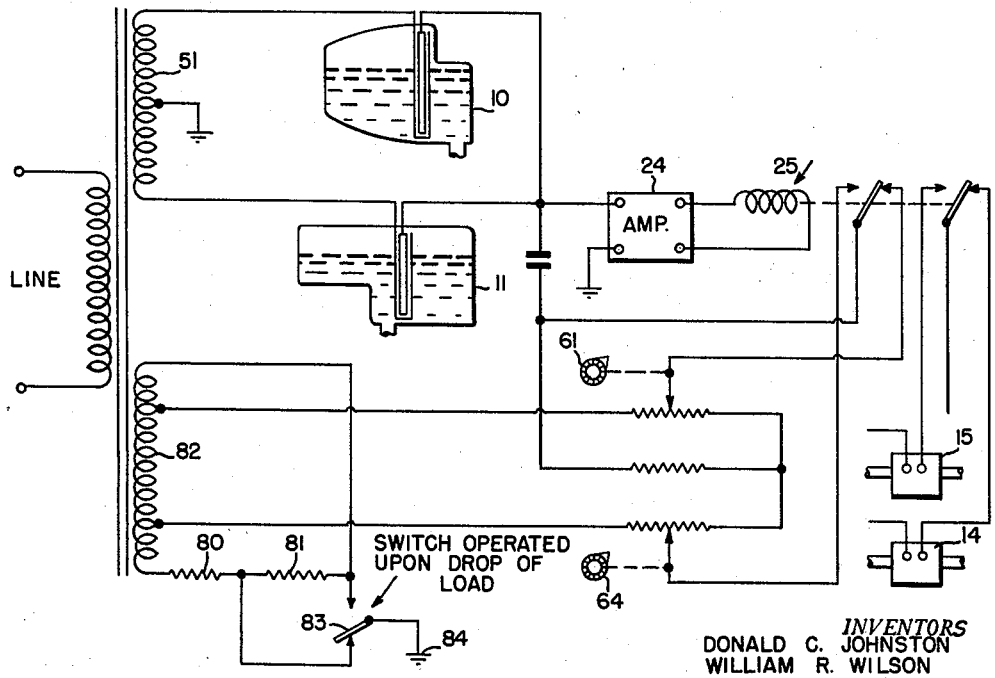

These and other objects of the present invention will be apparent to those skilled in the art upon reference to the following specification, claims and drawings; of which, Figure 1 is a showing of a graph plotting total fuel load vs. center of gravity position along the aircraft longitudinal axis and relating this to a schematic showing of an aircraft having a forward and an aft fuel tank, Figure 2 is the schematic showing of the present invention, Figure 3 is a schematic showing of a modification of the present invention, Figure 4 is a showing of a further modification of the present invention, Figure 5 is a showing of a further modification of the present invention, and Figures 6 and 7 are showings of representative tank units.

Referring specifically to Figure 1, a silhouette type showing of an aircraft showing the position of a forward and an aft fuel tank is related to a graph in which the total fuel load is plotted vs. the center of gravity position along the aircraft longitudinal or pitch axis. It is to be noted that while Figure 1 is related to a single axis of the aircraft, it is within the teaching of the present invention to also control the center of gravity of the aircraft along the roll axis.

The general requirement is that the distribution of the fuel be controlled to some specific pattern so as to maintain the overall center of gravity of the aircraft in its proper location. In other words, the sum of the moments about the desired overall aircraft center of gravity must equal zero. As can be seen in Figure 1, the desired center of gravity lies between the center of gravity of the aircraft and aircraft load and the center of gravity of the fuel. Therefore, the sum of the moment of the aircraft and its load about the desired center of gravity and the moment of the fuel about the desired center of gravity must be equal to zero, or must be such as to maintain the actual center of gravity of the aircraft within the allowable range of overall center of gravity deviations, as shown on the graph.

The graph shows a sharp deviation in the aircraft and load center of gravity and this is to designate the dropping of a load from the aircraft. At the same time that the load is dropped a shift in the fuel center of gravity is effected to maintain the actual center of gravity within the allowable range of center of gravity deviation.

Superimposed on the silhouette type showing of the aircraft is a forward fuel tank 10 and an aft fuel tank 11. Associated with fuel tanks 10 and 11 are capacitor tank units 12 and 13, associated with the forward and aft tanks, respectively. Valves 14 and 15 are associated with the forward and aft fuel tanks respectively and control the flow of fuel from the tanks to the aircraft engine.

The tank units 12 and 13 may be of the general type shown in the Robert A. Meyers copending application Serial No. 192,685, filed October 28, 1950, now Patent 2,741,124, with the tank units modified to be characterized in a manner to supply a signal which is indicative of the moment of the fuel in the respective tanks with respect to the desired center of gravity of the aircraft.

The above mentioned copending application deals with characterizing a tank unit to be used with an irregular fuel tank so as to obtain equal changes in capacitance of the tank unit for equal changes in fuel quantity. This teaching can be extended to characterizing a tank unit to obtain equal changes in capacitance of the tank unit for equal changes in fuel moment about a given axis.

Figures 6 and 7 are showings of representative tank units such as 12 and 13 respectively. Each of these tank units has a first capacitor electrode in the form of a tubular member 100. Inside of the tubular member 100 is mounted a further tube of insulation on which two conductive patterns are placed. A first of these patterns 101 is connected to ground potential. A second of these patterns 102 forms the second capacitor electrode and is shaped so that the capacitance value of the tank unit capacitor comprising electrodes 100 and 102 will vary in a linear fashion with variations in the fuel moment in the tanks 10 and 11. As can be seen in Figures 6 and 7, the patterns 101 and 102 are not connected electrically but are separated by a relatively thin gap 103 through which the tube of insulation can be seen.

Referring now specifically to Figure 2, the fuel tanks 10 and 11 and the tank units 12 and 13 are shown associated schematically with the circuitry of the present invention. This circuit includes a transformer 20 having a secondary 21 which is tapped and grounded at 22. The tank units 12 and 13 are connected in a series circuit to the end terminals of the secondary 21 and the connection of tank units 12 and 13 forms a terminal 23. It should be noted that the grounded patterns, such as 101 of Figures 6 and 7, are not shown.

Terminal 23 is connected to the input of an amplifier 24 having a relay 25 connected in the output circuit thereof. Amplifier 24 is an amplifier which is sensitive only to a signal of a first phase and affects energization of relay 25 only when a signal of the first phase is applied to the input of the amplifier. For signals of the opposite phase the relay 25 remains deenergized.

Relay 25 includes a first movable switch blade 26 and a second movable switch blade 27. Movable switch blades 26 and 27 are biased, by means not shown, to engage contacts 28 and 29 respectively when relay 25 is deenergized. Upon energization of relay 25, the movable switch blades 26 and 27 move into engagement with stationary contacts 30 and 31 respectively.

Movable switch blade 27 and its associated stationary contacts 29 and 31 are connected to control the energization of the fuel valves 14 and 15 which valves control the distribution of fuel in the forward and aft fuel tanks to control the fuel center of gravity as shown in Figure 1.

Movable switch blade 26 and the associated contacts 28 and 30 control the supply of a further voltage to the input of amplifier 24 to control the moment unbalance limits of the system, or stated in another way, to control the differential of the system.

This above mentioned further voltage is obtained from a first potentiometer 32 having a wiper 33 or from a second potentiometer 34 having a wiper 35. The wipers 33 and 35 of the potentiometers are controlled by means such as manually operable means 36 and 37. The manually operable means 36 and 37 are effective to control the position of potentiometer taps 33 and 35 and thereby control the magnitude of voltage which is applied to the input of amplifier 24 through a circuit which includes a capacitor 38.

The operation of the apparatus of Figure 2 will now be described. With the apparatus as shown in Figure 2, valve 14 is energized through a circuit which can be traced from a power line conductor 39 through conductor 40, valve 14, contact 29 and switch blade 27 of relay 25, and conductor 41 to a second power line conductor 42. Energization of valve 14 causes fuel to be drained from the forward fuel tank 10. It will be assumed that the fuel valve 14 has just been energized. This means that the moment of the fuel in the forward tank is greater than the moment of the fuel in the aft tank and that fuel must be withdrawn from the forward tank to restore the center of gravity to the allowable range of center of gravity deviation. Since the tank units 12 and 13 are characterized to give a signal indicative of the moment of the forward and aft tanks, the capacitance of the forward tank is greater than the capacitance of the aft tank at this particular time under consideration. Since the capacitance of tank unit 12 is the greater, the reactance of tank unit 12 is less than the reactance of the tank unit 13. Therefore, the potential of terminal 23 is above ground potential. The secondary 21 has been arbitrarily designated as being positive on the upper terminal and negative on the lower terminal. With the conditions as arbitrarily designated the terminal 23 would have applied thereto a positive voltage. It is recognized that the voltage on the terminal 23 is an alternating current voltage of a first or a second phase. The positive voltage on terminal 23 is arbitrarily designated as a voltage of a second phase, remembering that a voltage of a second phase to the input of amplifier 24 does not cause relay 25 to be energized. In the deenergized position of relay 25, valve 14 is energized as above described.

Relay 25 in the deenergized condition also connects a terminal 43 to a positive source of voltage at potentiometer tap 33. This can be seen by tracing a circuit from ground connection 22 through the lower portion of potentiometer 32, potentiometer tap 33, conductor 44, contact 28 and switch blade 26 of relay 25, conductor 45, terminal 43, and resistor 46 to ground potential. It can be seen that this last traced circuit places, through capacitor 38, an additional positive voltage on the input of amplifier 24. This additional positive voltage aids the voltage applied to terminal 23 and determines the moment unbalance limit or differential of the system. Or stated another way, the magnitude of the positive voltage on terminal 43 determines the amount that the moment of tank 11 will be allowed to increase over the moment of tank 10 as fuel is drained from tank 10 before a negative voltage is applied to amplifier 24 to cause the relay 25 to be energized and to cause valves 14 and 15 to be respectively deenergized and energized.

The operation of the device with valve 14 energized will continue causing the fuel level to decrease in tank 10 and causing the moment of tank 10 to decrease. As the moment of tank 10 decreases the positive voltage applied to terminal 23 will likewise decrease. A point will eventually be reached where the capacitance of tank units 12 and 13 are such that a signal voltage is no longer applied to terminal 23 from the circuit including the two tank units. However, at this time the positive voltage being supplied from the above traced circuit including terminal 43 is still being applied to the input of amplifier 24. Therefore, fuel will continue to flow from tank 10 causing the voltage on terminal 23 to change to a negative value. This voltage normally will cause relay 25 to be energized. However, the negative voltage on terminal 23 must increase to overcome the positive voltage on terminal 43. It can be seen from this that the extent of moment deviation, or differential, is controlled by the magnitude of the voltage on terminal 43, which in turn is controlled by the position of potentiometer tap 33.

When a sufficient amount of fuel has been withdrawn from tank 10 a negative voltage will be applied to the input of amplifier 24 and relay 25 will be energized. As soon as relay 25 is energized the movable switch blades 26 and 27 move into engagement with stationary contacts 30 and 31.

Consider now the instant that movable switch blade 26 disengages contact 28. At this time the positive voltage which has been applied to terminal 43 and thereby to the input of amplifier 24 will disappear. This will produce a sudden rise in the magnitude of the negative voltages to the input of amplifier 24 which initially caused relay 25 to be energized and in this manner a snap action of relay 25 is produced.

When movable switch blade 26 moves into engagement with contact 30 a negative voltage is supplied to the terminal 43 from potentiometer tap 35 to control the amount of moment unbalance which is allowed to occur as fuel is withdrawn from the tank 11. Movable switch blade 27 moving into engagement with contact 31 energizes fuel valve 15 to cause fuel to be drained from tank 11.

With fuel now being withdrawn operation of the apparatus is similar to that above described wherein the capacitance value of the tank unit 13 continues to decrease to indicate a decreasing moment as the fuel level in tank 11 drops. The point is eventually reached where the moments of the fuel in tanks 10 and 11 are equal. However, at this time a negative voltage is supplied from potentiometer tap 35 and this voltage causes relay 25 to remain energized. The magnitude of this voltage, which is determined by the position of potentiometer tap 35, determines the amount of moment unbalance which will be allowed before relay 25 is deenergized. Or stated in another way, the position of potentiometer tap 35 controls the amount by which the moment of the fuel in tank 10 is allowed to increase over the moment of the fuel in tank 11 before a positive voltage is applied to the input of amplifier 24 to cause relay 25 to be deenergized and cause the apparatus to function as first above described.

Referring now to Figure 3, the tank units 12 and 13 are shown associated with a transformer 90 having a secondary 88 and voltage dividing means 92 connected across the end terminals thereof. Voltage dividing means 92 consist of a potentiometer 93 having a wiper 94, a resistor 95, a further potentiometer 96 having a wiper 97, and a resistor 98. The connection of resistor 95 to potentiometer 96 is grounded at terminal 89.

The capacitive tank units 12 and 13 are connected in a series circuit to a lower terminal of secondary 88 and to tap 94 of potentiometer 93, which tap is effectively the upper terminal of secondary 88. The common connection of tank units 12 and 13 forms a terminal 87.

Potentiometer tap 94 is provided as an initial calibrating means for the apparatus and functions to change the voltage applied from tap 94 to tank unit 12 to provide for initial calibration of the apparatus.

Terminal 87 is connected to the input of an amplifier 24 having a relay 25 connected in the output thereof. Amplifier 24, relay 25 and its associated switch blades and contacts are similar to that described in connection with Figure 2 and retain like reference numerals.

As in Figure 2, the movable switch blade 27 of relay 25 controls the energization of valves 14 and 15. However, movable switch blade 26 of relay 25 performs the function of connecting either the upper terminal of resistor 95 or the movable tap of potentiometer 96 to ground potential at terminal 86. Such switching action by movable switch blade 26 is effective to change the voltage applied across the tank units 12 and 13. In other words, movable switch blade 26 in the position shown is in engagement with contact 28 and effectively grounds the upper terminal of resistor 95. This lowers the voltage which is applied across tank unit 12. When movable switch blade 26 engages contact 30 the movable tap 97 of potentiometer 96 is effectively grounded and this lowers the voltage across tank unit 13. At the same time that the voltage across tank unit 13 is lowered the voltage across tank unit 12 is raised since the upper terminal of resistor 95 is no longer grounded.

It should be noted that in the apparatus of Figure 3 the movable switch 27 when engaging contact 29 of relay 25 energizes valve 15 and in the energized position of relay 25 energizes valve 14. This is reverse to the operation of Figure 2.

With the apparatus of Figure 3 in the position shown, the valve 15 is energized and fuel is being drained from the tank 11. If it is assumed that valve 15 has just been energized it follows that the moment of the fuel in tank 11 is greater than the moment of the fuel in tank 10. Therefore, the capacitance of tank unit 13 is greater than the capacitance of tank unit 12. Since the reactance of the capacitance tank units bear an inverse relationship to their capacitance values, the reactance of tank unit 13 is the smaller of the two and if it is assumed that the secondary 88 has the polarity as shown, the terminal 87 will have a positive voltage impressed thereon.

When relay 25 is in the deenergized position the movable switch blade 26 engages contact 28 and connects the upper terminal of resistor 95 to ground potential at 86. This effectively lowers the voltage across the tank unit 12 and controls the moment unbalance limits or the differential of the apparatus as will be described.

Fuel continues to be withdrawn from the tank 11 until the point is reached where the moments of the fuel in the two tanks are equal. The terminal 87, however, at this time still has a positive voltage thereon due to the fact that a lower than normal voltage is applied across tank unit 12. Fuel continues to be withdrawn from tank 11 and the moment of the fuel in tank 10 becomes larger than the moment of the fuel in tank 11. A point is eventually reached where even with the reduced voltage across tank unit 12 the voltage on terminal 87 changes to a negative voltage. This causes relay 25 to be energized. Energization of relay 25 causes movable switch blades 26 and 27 to disengage contacts 28 and 29 respectively.

Consider now the instant that movable switch blade 26 disengages contact 28, the voltage across tank unit 12 immediately increases and the negative voltage applied to the input of amplifier 24 thereby increases to produce snap action of relay 25.

When movable switch blade 26 engages stationary contact 30 the potentiometer tap 97 is effectively connected to ground. This reduces the voltage across the capacitive tank unit 13 and effectively increases the negative voltage applied to the input of amplifier 24. Movable switch blade 27 of relay 25 also engages contact 31 to energize valve 14 to cause the draining of fuel from tank 10.

The draining of fuel in tank 10 continues until a positive voltage is again applied to the input of amplifier 24 at which time relay 25 is deenergized.

It can be seen from this description that the moment unbalance when relay 25 is deenergized and valve 15 is energized to drain tank 11 is not variable since contact 28 is connected permanently to the upper terminal of resistor 95. However, the differential of the apparatus when relay 25 is energized to drain tank 10 is adjustable by means which may be manually operable means 99, which means controls the position of potentiometer tap 97.

Referring again to Figure 1, the graph therein has a portion labeled allowable range of overall center of gravity deviation. It is within this range that the center of gravity of the aircraft, considering the weight of the aircraft, the weight of the load, and the weight of the fuel, is allowed to vary and is adjusted by means of the manually operable means 36 and 37 of Figure 2 or the manually operable means 99 of Figure 3.

A further modification of the present invention is shown in Figure 4 wherein the tanks 10 and 11, the tank units 12 and 13, the amplifier 24 and the relay 25 are similar to those previously described and retain the same reference numerals.

At times it is necessary for the pilot of the aircraft to shift the desired center of gravity point of the aircraft. Figure 4 shows an apparatus which permits the shifting of the desired center of gravity without shifting the moment unbalance limits about this center of gravity.

The apparatus of Figure 4 includes a transformer 50 having a first secondary winding 51 tapped and grounded at 52, and having a second secondary winding 53. The tank units 12 and 13 are connected in a series circuit to the end terminals of secondary 51 and the common connection of the tank units 12 and 13 form a terminal 54.

A potentiometer 55 having a movable tap 56 is provided and is connected to the end terminals of secondary 53 with the tap 56 connected to a ground terminal at 57. A means, which may be manually operable means 58, is provided to control the position of potentiometer tap 56 and it is this means which controls the position of the desired center of gravity of the aircraft, as shown on the graph of Figure 1.

A second potentiometer 59 is provided having a movable tap 60 whose position is controlled by a manually operable means 61. A third potentiometer 62 is provided having a movable tap 63 whose position is controlled by a further manually operable means 64. The manually operable means 61 and 64 are similar to the manually operable means 36 and 37 of Figure 2 or the manually operable means 99 of Figure 3 in that they control the moment unbalance limits of the apparatus.

With the apparatus as shown in Figure 4, the valve 14 is energized through contact 29 and movable switch blade 26 of relay 25 to cause the draining of tank 10. If it is assumed that relay 25 has just been deenergized, it follows that the moment of the fuel in tank 10 is greater than the moment of the fuel in tank 11. Therefore, the reactance of the capacitive tank unit 12 is less than the reactance of the capacitive tank unit 13 and a positive signal is applied to terminal 54 and thereby to the input of amplifier 24. A further positive signal is applied to a terminal 65 and thereby through a capacitor 66 to the input of amplifier 24. This can be seen by tracing a circuit from terminal 65 through conductor 66, switch blade 26 and contact 28 of relay 25, and conductor 67 to the movable tap 60 of potentiometer 59. It can be seen that the tap 60 has a positive voltage thereon with respect to ground and that the magnitude of this positive voltage is controlled by the position of tap 56 of potentiometer 55, and by the position of tap 60 of potentiometer 59.

The draining of tank 10 continues until the moment of the fuel in the tanks 10 and 11 is equal. At this time a positive voltage is still applied to the input of amplifier 24 since the connection of potentiometer tap 60 to the input of amplifier 24 is still completed by movable switch blade 26 and stationary contact 28 of relay 25. The draining of tank 10 continues until the moment of tank 11 is sufficiently larger than the moment of tank 10 to cause a negative signal to be applied to the input of amplifier 24. This causes relay 25 to be energized and actuate its switch contacts 26 and 27.

Considering the instant that movable switch blade 26 disengages stationary contact 28, the circuit from potentiometer tap 60 to the input of amplifier 24 is broken and therefore a positive signal is no longer supplied through this circuit. This causes a sudden increase in the negative voltage applied to the input of amplifier 24 and causes snap action of the relay 25 to the energized position.

With relay 25 in the energized position movable switch blade 27 in engaging contact 31 energizes fuel valve 15 to drain tank 11. Also, movable switch blade 26 in engaging stationary contact 30 applies a negative voltage to the input of amplifier 24 through a circuit which can be traced from terminal 65 through conductor 66, switch blade 26 and contact 30 of relay 25, and conductor 70 to the movable tap 63 of potentiometer 62. This increases the negative voltage input applied to the amplifier 24 and controls the differential in moment unbalance which will exist between the tanks 10 and 11 before a positive voltage is applied to the input of the amplifier 24 to deenergize relay 25.

The manually operable means 61 and 64 are effective to control the differential or range of overall center of gravity deviation as shown in the graph of Figure 1. By adjusting the means 61 and 64 this range may be made equal to the allowable range of deviation as shown in Figure 1 or a smaller range of deviation somewhere within this allowable range.

Movement of manually operable means 58 controls the potential point on secondary 53 which is connected to ground. This controls the relative magnitude of the voltages present on potentiometer wipers 60 and 63 with respect to ground but does not vary the voltage between the potentiometer wipers. This means that the range of center of gravity deviation or the differential of the apparatus remains constant but the desired center of gravity of the apparatus is shifted either within this range or without the range by movement of the manually operable means 58. In other words, this effects simultaneous shifting of the moment unbalance limits without changing the moment unbalance spread between them.

For example, if the potentiometer tap 56 were positioned on the lower extreme of the potentiometer 55 the voltage present on both potentiometer taps 60 and 63 would always be positive with respect to the ground terminal 57. This means that regardless of whether or not the relay 25 was energized or deenergized the terminal 65 will have a positive voltage thereon. The difference in the voltage on terminal 65 when the relay is energized or deenergized is the same regardless of where the tap 56 is set on potentiometer 55, assuming that taps 60 and 63 are not moved. However, the effect on the input of the amplifier 24 is to at all times apply a positive voltage to the input. This means that the moment exerted by tank 11 is always greater than the moment exerted by tank 10 since the voltage applied to terminal 65 is a large positive voltage when relay 25 is deenergized and tank 10 is draining and is a smaller positive voltage when relay 25 is energized and tank 11 is draining. This smaller positive voltage prevents the moment of tank 11 from ever becoming equal to the moment of tank 10. This normally would not be desirable, however, under certain conditions such as the dropping of a load which the aircraft may be carrying, it is desirable to have this condition exist and this condition is controlled as above described by operation of manually operable means 58.

The modification of Figure 5 is substantially identical to the modification of Figure 4 wherein the potentiometer 55 of Figure 4 is replaced by a first resistor 80 and a second resistor 81 which are connected in series and to the end terminals of a secondary winding 82. As shown in Figure 5, the connection of resistors 80 and 81 is connected to a ground terminal 84 through a switch 83. This switch is actuated, by means not shown, upon the drop of a load from the aircraft in a manner similar to that shown in Figure 2 of Patent No. 2,751,921, issued June 25, 1956, filed August 10, 1953 and issued to the common assignee. It can be seen that when this load is dropped the upper terminal of secondary 82 is connected to ground at 84. The operation under such a condition is identical to that described and the only difference between the modifications of Figure 4 and Figure 5 is that the manually operable means 58 of Figure 4 is replaced by an automatic operable means such as the switch 83 of Figure 5.

These and other modifications of the present invention will be apparent to those skilled in the art. It is however intended that the scope of the present invention be limited solely by the appended claims, of which we claim as our invention:

1. Center of gravity control apparatus for use with an aircraft having a plurality of fuel tanks, comprising; a bridge network having sensing means in opposite legs thereof, said sensing means being associated with the fuel tanks and arranged to provide a signal indicative of the moment of the fuel located on a first and an opposite side of a given point in the aircraft, signal responsive means connected to said bridge network to control the feeding of fuel from the fuel tanks in accordance with the condition of balance of said bridge network, and means controlled by said last named means to control the condition of balance of said bridge network and thereby control the range of variation of the aircraft center of gravity.

2. Center of gravity control apparatus for use with an aircraft having a plurality of fuel tanks and a droppable load, comprising; a bridge network having sensing means in opposite legs thereof, said sensing means being associated with the fuel tanks and arranged to provide a signal indicative of the moment of the fuel located on a first and an opposite side of a given point in the aircraft, signal responsive means connected to said bridge network to control the feeding of fuel from the fuel tanks in accordance with the condition of balance of said bridge network, means responsive to dropping of the load to control the operation of said bridge network, and means controlled by said signal responsive means to control the condition of balance of said bridge network and thereby control the range of variation of the aircraft center of gravity.

3. Center of gravity control apparatus for use with an aircraft having fuel tanks disposed on opposite sides of an axis, comprising; an electrical bridge network, moment sensing means connected in opposite legs thereof and arranged to sense the moment of the fuel in the tanks disposed on opposite sides of the axis, means connected to said bridge network to be controlled by the state of balance of said bridge network to control the draining of fuel from the tanks, and means controlled by said last named means to increase the unbalance of said bridge network to thereby control the range of unbalance of the aircraft center of gravity.

4. Control apparatus for controlling the center of gravity of an aircraft by controlling the distribution of fuel in fuel tanks thereof, comprising; first and second moment sensing means associated with the fuel tanks located on opposite sides respectively of an axis; a transformer secondary having a grounded tap, circuit means connecting said first and second moment sensing means in a series circuit to end terminals of said secondary; voltage responsive means having an input and an output, circuit means connecting said input to ground and to the connection of said first and second moment sensing means; a first and a second potentiometer each having a resistance element having a movable tap cooperating therewith, circuit means connecting said resistance elements in series and to said secondary on opposite sides of said grounded tap, circuit means connecting the connection of said resistance elements to ground; means controlled by the output of said voltage responsive means for selectively connecting one or the other of said potentiometer taps to the input of said voltage responsive means; and means operable to selectively position said potentiometer taps.

5. Control apparatus for controlling the center of gravity of an aircraft by controlling the distribution of fuel in fuel tanks thereof, comprising; first and second moment sensing means associated with the fuel tanks located on opposite sides respectively of an axis of the aircraft; a transformer having a secondary winding, circuit means connecting said first and second moment sensing means in a series circuit to end terminals of said secondary winding; voltage dividing means, circuit means connecting said voltage dividing means to the end terminals of said secondary winding, means connecting an intermediate point of said voltage dividing means to a reference potential level; voltage responsive means having an input and an output, means connected in said output to control the distribution of fuel in the fuel tanks of the aircraft, circuit means connecting said input to said reference potential level and to the connection of said first and second moment sensing means; and means controlled by said means connected in the output of said voltage responsive means to selectively connect a point above or below said intermediate point of said voltage dividing means to said reference potential level to reduce the voltage applied to said first or said second sensing means and thereby control the range of variation of the aircraft center of gravity.

6. Control apparatus for controlling the center of gravity of an aircraft by controlling the distribution of fuel in fuel tanks thereof, comprising; first and second moment sensing means associated with the fuel tanks located on opposite sides respectively of an axis of the aircraft; a transformer having a secondary winding having a grounded tap, circuit means connecting said first and second moment sensing means in a series circuit to end terminals of said secondary winding; voltage responsive means having an input and an output, means controlled by said output arranged to control the distribution of fuel in the fuel tanks of the aircraft, circuit means connecting said input to ground and to the connection of said first and second moment sensing means; a second transformer secondary winding, means connecting said second transformer secondary winding to ground potential; a first and a second potentiometer each having a resistance element and a movable tap cooperating therewith, circuit means connecting said resistance elements of said first and second potentiometers in a series circuit to intermediate points of said second transformer secondary winding; circuit means controlled by said voltage responsive means to selectively connect the movable tap of said first or second potentiometer to the input of said voltage responsive means to thereby control the range of variation of the aircraft center of gravity, and means operable to selectively position the taps of said first or second potentiometer to control the extent of the range of variation of the aircraft center of gravity.

7. Control apparatus for use with a vehicle having an axis, comprising; a source of alternating current voltage having one terminal thereof connected to a reference potential and having a second and a third terminal of a first phase and an opposite phase respectively, a first and second variable load located on opposite sides of the axis of the vehicle, a first and a second moment sensing means associated with said first and said second loads respectively, voltage responsive means, means connecting said first and second moment sensing means to said second and third terminals respectively and to said voltage responsive means to apply a control voltage thereto of said first or said opposite phase indicative of the position of the center of gravity of the vehicle relative to the axis, means controlled by said voltage responsive means for controlling the relative magnitude of said first and second load to control the center of gravity of the vehicle, and means connected to said voltage responsive means and controlled by said voltage responsive means to increase said control voltage to thereby control the range of variation of the center of gravity of the vehicle.

8. Center of gravity control apparatus for use with an aircraft having a first and a second fuel tank located on opposite sides of an axis, comprising; a capacity bridge network having a first and a second capacity moment sensor associated with the first and second fuel tanks respectively and connected in adjacent legs of the bridge, said bridge network having a point of reference potential and an output terminal with a control voltage thereon of a first or a second phase indicative of the moment unbalance of the first and second fuel tanks on one or the other side respectively of the axis, voltage responsive means connected to said output terminal and point of reference potential to thereby respond to said control voltage, means controlled by said voltage responsive means to selectively control the draining of fuel from the first or second fuel tank to tend to restore the moment unbalance to zero, and means controlled by said voltage responsive means to increase said control voltage of said first or second phase to which said voltage responsive means is responding to thereby cause the actual moment of the fuel tanks to be unbalanced in the opposite direction by draining of fuel before said voltage responsive means responds to the resultant moment unbalance.

9. Apparatus of the class described comprising, in combination: a first voltage source of a first phase; a second voltage source of a second phase, opposite to said first phase; a first capacitive moment sensor; a second capacitive moment sensor; voltage responsive means having an input and an output; means connecting said first moment sensor to said first voltage source and to the input to said voltage responsive means; means connecting said second moment sensor to said second voltage source and to the input of said voltage responsive means; a third voltage source of said first phase; a fourth voltage source of said second phase; switch means operable to first and second positions by the output of said voltage responsive means; means including said switch means in the first position connecting said third voltage source to the input of said voltage responsive means; and means including said switch means in the second position connecting said fourth voltage source to the input of said voltage responsive means.

10. Apparatus of the class described comprising, in combination: a first source of voltage of a first phase; a second source of voltage of phase opposite to the first phase; first and second capacitive sensors; voltage responsive means having an input and an output movable to a first position when the voltage at the input is of the first phase and to a second position when the voltage at the input is of the phase opposite to the first phase; means connecting said first capacitive sensor to said first source of voltage and to the input of said voltage responsive means to apply a voltage of the first phase thereto; means connecting said second capacitive sensor to said second source of voltage and to the input of said voltage responsive means to apply a voltage of phase opposite to the first phase thereto; means including the output of said voltage responsive means in the first position applying an additional voltage of the first phase to the input of said voltage responsive means and means including the output of said voltage responsive means in the second position applying an additional voltage of the second phase to the input of said voltage responsive means.

11. Apparatus for controlling the center of gravity of a vehicle having a changing load on either side of an axis, comprising: a first sensor having an impedance variable according to the moment of a first load on one side of the axis; a second sensor having an impedance variable according to the moment of a second load on the other side of the axis; a first source of voltage of a first phase; voltage responsive means having an input and an output; means connecting said first sensor to said first source of voltage and to the input of said voltage responsive means to provide a signal of first phase and of magnitude variable with the moment of the first load; a second source of voltage of a phase opposite to the first phase; means connecting said second sensor to said second source of voltage and to the input of said voltage responsive means to provide a signal of the second phase and of magnitude variable with the moment of the second load; switch means operable to first and second positions connected to the output of said voltage responsive means and operable according to the phase of the signal at the input of said voltage responsive device; means operable by said switch means in the first position to increase the signal of the first phase at the input of said voltage responsive means and in the second position to increase the signal of the second phase at the input of said voltage responsive means, said last named means thereby providing a predetermined range of allowable variation in the signal input to said voltage responsive means; and further means operable by said switch means to control the changing of the loads on the vehicle.

12. Apparatus according to claim 9 wherein said third and fourth voltage sources have a changeable magnitude and switching means is provided to change the magnitude of said third and fourth voltage sources upon a load being dropped from the aircraft.

References Cited in the file of this patent

UNITED STATES PATENTS

| | | |
|---|---|---|
| 2,672,880 | Hermanson | Mar. 23, 1954 |
| 2,687,168 | Haviland | Aug. 24, 1954 |
| 2,751,921 | Baldwin et al. | June 26, 1956 |
| 2,769,338 | Hermanson | Nov. 6, 1956 |
| 2,817,351 | Kling | Dec. 24, 1957 |

FOREIGN PATENTS

| | | |
|---|---|---|
| 693,600 | Great Britain | July 1, 1953 |
| 695,074 | Great Britain | Aug. 5, 1953 |

OTHER REFERENCES

"Electronics," Issue of April 1950, pp. 77–79.